United States Patent
Gurney et al.

(10) Patent No.: US 7,848,060 B2
(45) Date of Patent: *Dec. 7, 2010

(54) INTEGRATED SERVO AND READ EMR SENSOR

(75) Inventors: Bruce Alvin Gurney, San Rafael, CA (US); Ernesto E. Marinero, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/487,345

(22) Filed: Jun. 18, 2009

(65) Prior Publication Data
US 2009/0251820 A1  Oct. 8, 2009

Related U.S. Application Data

(63) Continuation of application No. 11/069,732, filed on Feb. 28, 2005, now Pat. No. 7,564,656.

(51) Int. Cl.
*G11B 5/39* (2006.01)
*G01R 33/09* (2006.01)

(52) U.S. Cl. .................. 360/316; 324/246; 324/252

(58) Field of Classification Search ............ 360/121, 360/316; 324/246, 247, 249, 252
See application file for complete search history.

(56) References Cited

U.S. PATENT DOCUMENTS

| | | | | | |
|---|---|---|---|---|---|
| 5,488,525 | A | * | 1/1996 | Adams et al. | 360/121 |
| 5,530,608 | A | * | 6/1996 | Aboaf et al. | 360/316 |
| 5,982,711 | A | * | 11/1999 | Knowles et al. | 360/75 |
| 7,295,406 | B2 | * | 11/2007 | Chattopadhyay et al. | 360/313 |
| 7,502,206 | B2 | * | 3/2009 | Gurney et al. | 360/313 |
| 7,564,656 | B2 | * | 7/2009 | Gurney et al. | 360/316 |
| 7,738,219 | B2 | * | 6/2010 | Boone et al. | 360/313 |
| 2006/0018054 | A1 | * | 1/2006 | Chattopadhyay et al. | 360/313 |
| 2009/0128963 | A1 | * | 5/2009 | Boone et al. | 360/313 |

* cited by examiner

*Primary Examiner*—Craig A. Renner
(74) *Attorney, Agent, or Firm*—Zilka-Kotab, PC

(57) ABSTRACT

A magnetic storage system according to one embodiment includes magnetic media containing magnetic domain tracks; and at least one head for reading from the magnetic media, each head having: a first Extraordinary Magentoresistive (EMR) device for detecting magnetic fields of a first magnetic domain track; a second EMR device for detecting magnetic fields of a second magnetic domain track. The system further includes a slider for supporting the head; and a control unit coupled to the head for controlling operation of the head. A system according to another embodiment includes a first Extraordinary Magnetoresistive (EMR) device for detecting magnetic fields of a magnetic domain of interest. A system according to yet another embodiment includes an Extraordinary Magnetoresistive (EMR) device for deriving servoing information.

14 Claims, 12 Drawing Sheets

INTEGRATED SERVO AND READ EMR SENSOR

RELATED APPLICATIONS

This application is a continuation of U.S. patent application No. 11/069,732, filed Feb. 28, 2005, now U.S. Pat. No. 7,564,656 issued Jul. 21, 2009, which is herein incorporated by reference.

FIELD OF THE INVENTION

The present invention relates to magnetoresistive sensors and more particularly to a device employing multiple Extraordinary Magnetoresistive (EMR) sensors for e.g., reading servo and data information from a magnetic medium.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic bits to and reading magnetic bits from the rotating disk. The read and write heads are connected to processing circuitry that operates according to a computer program to implement the writing and reading functions.

In recent read head designs a spin valve sensor, also referred to as a giant magnetoresistive (GMR) sensor has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of die pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal resulting in a low resistance state and when the magnetizations of the pinned and free layer are antiparallel, scattering is maximized resulting in a high resistance state. Changes in scattering alter the resistance of the spin valve sensor in proportion to $\cos\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause voltage changes that are detected and processed as playback signals.

In the ever increasing push for increased data rate and data capacity, engineers and scientists have continually found ways to make magnetoresistive sensors ever smaller. However such sensors are rapidly approaching a limit beyond which further reduction in size cannot be achieved. This is due in part to thermally induced fluctuations of the magnetization direction of the magnetic layers and in particular on the free layer magnetization in a Giant Magnetoresistance (GMR) or similar sensor. Thermal agitation becomes more severe as the sensor becomes smaller and the volume of the magnetic layers decreases accordingly. The magnetization fluctuation within the layers results in an increased sensor noise. Another form of noise that limits the extension of some sensors to small dimensions is present in GMR devices operated with the current perpendicular to the plane of the layers called spin torque noise that also contributes to the noise and reduces the signal to noise ratio of such devices. Other types of sensors that use magnetic layers have been investigated, including magnetic tunnel junction (MTJ) heads. Just like GMR heads, the MTJ heads exhibit magnoise and spin torque noise, both of which increase as device dimensions are made smaller. MTJ sensors also exhibit shot noise. With decreasing dimension eventually these noise sources will increase sufficiently to render many types of sensor unusable. Therefore, there is a need for a sensor that does not require the use of magnetic layers, and more specifically does not employ a magnetic free layer.

In order to develop such a non-magnetic magnetoresistive sensor, researchers have recently begun investigating what is referred to as the extraordinary magnetoresistive (EMR) effect. EMR theory is described by T. Zhou et al., "Extraordinary magnetoresistance in externally shunted van der Pauw plates", *Appl. Phys. Lett.*, Vol. 78, No. 5, Jan. 29, 2001, pp. 667-669. An EMR sensor for read-head applications is described by S. A. Solin et al., "Nonmagnetic semiconductors as read-head sensors for ultra-high-density magnetic recording", *Appl. Phys. Lett.*, Vol. 80, No. 21, 27 May 2002, pp. 4012-4014.

An EMR sensor operates based on the Hall Effect. When a charge carrier, such as an electron is moving through a material in the presence of both an electrical field and a magnetic field, the electron will be subject to a force along the electric field and a force given by the cross product of its velocity and the magnetic field. Thus the magnetic field tends to deflect the movement of carrier away from the direction of its motion. In some Hall devices that operate in a steady state, the carriers flow at an angle (called the Hall angle) with respect to the electric field given by $\tan(\theta)=(Mu)\times(B)$, where Mu is the material's mobility and B is the magnetic field. Some semiconductors can be made with Mu as large as about 60,000 $cm^2/Vs$ (=6/Tesla). At a magnetic field of 1 Tesla a Hall angle of 81 degrees can be achieved between the electric field and current flow resulting in a substantial change in the direction of motion of the carriers in a magnetic field.

An EMR device in its simplest form consists of an Ohmic bilayer structure of a metal and a high mobility semiconductor. When a pair of current leads are connected to a surface of the semiconductor at either end of the semiconductor, the current will tend to flow through the semiconductor to the more conductive metal (located opposite the current leads). The current will then travel readily through the more conductive material and then back through the semiconductor to the other current lead. When a magnetic field is applied perpendicular to the plane of the device, the Hall Effect will deflect the electrons so that some of them travel a longer distance through the more highly resistive semiconductor thus increasing the overall resistance of the device. This results in an increased resistance, which can be read as a voltage difference across the semiconductor, measured by voltage leads located on the same surface as the current leads. Thus the magnetoresistance of the device can be defined as the change in voltage between the voltage leads dVvv divided by the voltage applied to the current leads Vii, or $$MR=dVvv/Vii.$$

Additionally, resistances for the voltage leads Rvv and current leads Rii can be defined by dividing through by whatever current is flowing through the structure, so that $$MR=dVvv/Vii=dRvv/Rii.$$

While such EMR devices provide the advantage of sensing a magnetic field without the use of a magnetic layer such as a free layer, EMR devices have not yet been used in disk drive devices. This is because other magnetoresistive sensors such as GMR sensor have provided sufficient sensitivity and bit resolution for bit sizes used so far. But as bit sizes narrow GMR and other sensors will be unable to achieve the necessary resolution, making an alternative necessary. Particularly, the bit size and track density required for ultrahigh density magnetic recording present formidable challenges for current-art magnetic sensors and servo schemes. For example for recording at 1 Tb/in$^2$, the minimum domain size will be either a circular mark of ~15 nm in diameter or a rectangular ~15 nm×15 nm bit. The track spacing required to meet this areal density is ~25 nm. The minute flux emanating from such nanoscale domains is challenging to detect with current-art sensors, on account of fundamental limitations intrinsic to sensors based on ferromagnetic materials such as magnetic noise and spin torque effects. Furthermore, current-art sector servo schemes while effective for track seeking and synchronization operations, do not permit active feedback of the positioning of the write/read head during data writing and reading. This open-loop operation is expected to be a major source of errors and reliability failures as the track width and spacing fall below 50 nm. What is needed is a sensor device for ultrahigh density magnetic recording that allows on-the-fly real time detection of written bits in order to provide precise servo information to the sensor in a closed-loop configuration.

SUMMARY OF THE INVENTION

A magnetic storage system according to one embodiment includes a magnetic media containing magnetic domain tracks of interest; at least one head for reading from and writing to the magnetic media. Each head has: a sensor, further comprising: a first Extraordinary Magentoresistive (EMR) device for detecting magnetic fields of a magnetic domain track of interest; a second EMR device for positioning the first EMR device over the magnetic domain track of interest. At least one of the EMR devices comprises: a layer of electrically conductive material; a layer of semi-conductor material formed adjacent to and contacting the layer of electrically conductive material, the layer of semi-conductor material having an edge surface opposite the non-magnetic electrically conductive material and having first and second ends separated by a length (L); first and second electrically conductive current leads, in electrical communication with the semi-conductor material; and first and second electrically conductive voltage leads in electrical communication with the semiconductor material, the second current lead being located between the first and second voltage leads. The system further includes a writer coupled to the sensor; a slider for supporting the head; and a control unit coupled to the head for controlling operation of the head.

A magnetic storage system according to another embodiment includes magnetic media containing magnetic domain tracks; and at least one head for reading from the magnetic media, each head having: a first Extraordinary Magentoresistive (EMR) device for detecting magnetic fields of a first magnetic domain track; a second EMR device for detecting magnetic fields of a second magnetic domain track. The system further includes a slider for supporting the head; and a control unit coupled to the head for controlling operation of the head.

A system according to yet another embodiment includes a first Extraordinary Magnetoresistive (EMR) device for detecting magnetic fields of a magnetic domain of interest. The first EMR device comprises: a layer of electrically conductive material; a layer of semi-conductor material formed adjacent to and contacting the layer of electrically conductive material, the layer of semi-conductor material having an edge surface opposite the electrically conductive material and having first and second ends separated by a length (L); first and second electrically conductive current leads, in electrical communication with the semi-conductor material; and first and second electrically conductive voltage leads in electrical communication with the semi-conductor material, the second current lead being located between the first and second voltage leads.

A system according to yet another embodiment includes an Extraordinary Magnetoresistive (EMR) device for deriving servoing information, the EMR device comprising: a layer of electrically conductive material; a layer of semi-conductor material formed adjacent to and contacting the layer of electrically conductive material, the layer of semi-conductor material having an edge surface opposite the electrically conductive material and having first and second ends separated by a length (L); first and second electrically conductive current leads, in electrical communication with the semi-conductor material; and first and second electrically conductive voltage leads in electrical communication with the semiconductor material, the second current lead being located between the first and second voltage leads.

These and other aspects and advantages of the invention will become apparent upon further reading of the detailed description.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

The present invention utilizes an integrated read and servo device comprising two (or more) closely positioned narrow track EMR devices. For instance, two dedicated EMR sensors can be employed: one for data reading and one for servo operations.

Some embodiments of the present invention overcome the aforementioned drawbacks and provide the desired advantages by employing magnetic sensor elements based on the recently discovered Extraordinary Magneto Resistive (EMR) effect. EMR devices can provide a higher magnetoresistive response that current-art sensors, and as they comprise no ferromagnetic elements, they are free of magnetic noise which is caused by fluctuations of the magnetization direction on account of environmental thermal fluctuations. Two dedicated EMR sensors are employed in some embodiments of the invention: one for data reading and one for servo operations. The sensors are preferably configured in an abutted configuration. The high spatial resolution of the sensor elements comprising embodiments of this invention is achieved by matching the spacing between the probe leads that detect the magnetic excitations from the recorded medium, as well as the width of the semiconductor stripe to be of comparable dimensions to the track width being read (for the read sensor) and to the recorded information needed to be sensed for servo operations. Embodiments of the present invention allow on-the-fly real time detection of written bits in order to provide precise servo information to the sensor in a closed-loop configuration.

Embodiments of the invention also results in significant increments in areal density by allowing reduction or elimination of components of the servo-sector information typically found on state of the art hard disks. Furthermore, embodiments of the invention allows recording on patterned media exhibiting wider island position error tolerance than is otherwise required employing current-art servo schemes.

In addition to magnetic recording systems, a sensor according to one embodiment of the present invention is also useful in a magnetic imaging device such as a scanning magnetometer. Such a magnetometer includes a chuck for holding a workpiece and an actuator that is capable of moving the sensor in a rasterized pattern over the workpiece to read the magnetic topography of the workpiece. A sensor according to one embodiment of the present invention may also be useful in other devices requiring a high sensitivity, high resolution sensor.

Because EMR technology is new, to aid the understanding of the reader the following description shall begin with a description of EMR sensors, followed by a description of the integrated read and servo device.

EMR Sensor

Figure 1:
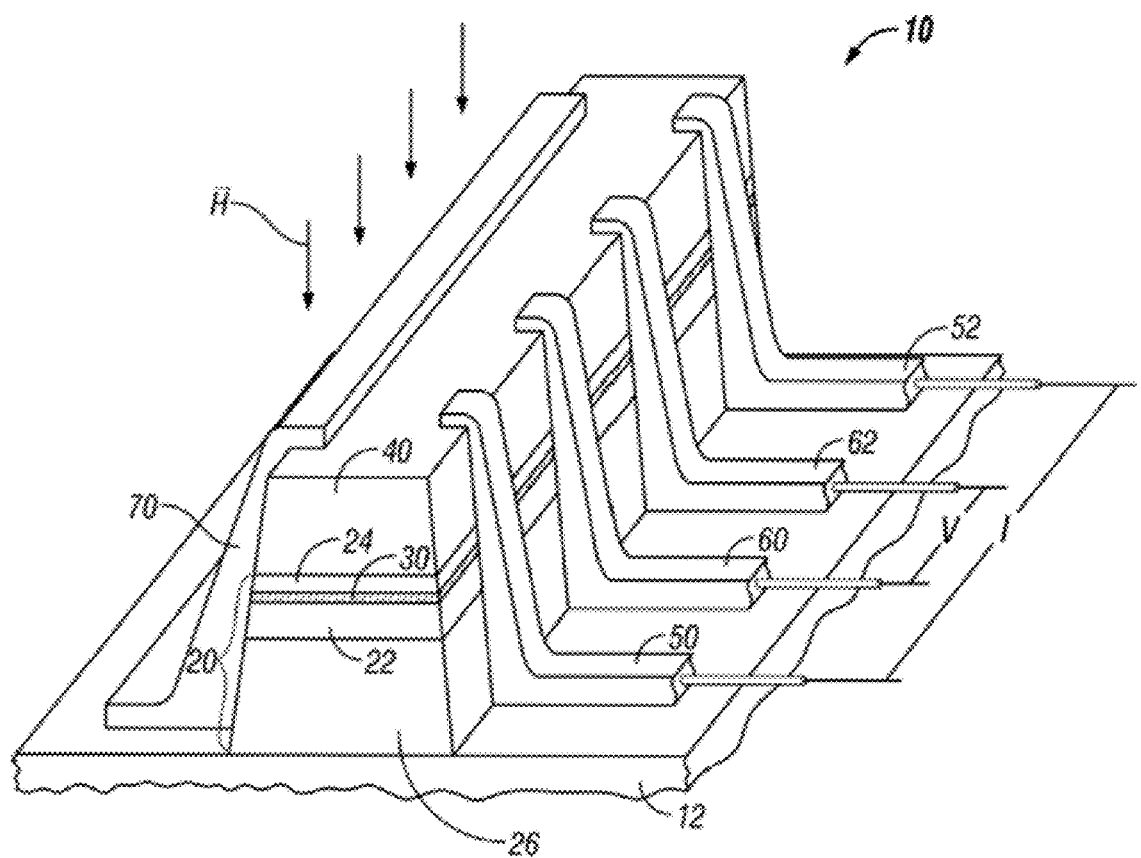
FIG. 1 is an isometric view of an EMR sensor.

FIG. 1 is an isometric view of an EMR sensor 10 according to one embodiment. The EMR sensor 10 includes a structure 20 that is a III-V heterostructure formed on a semiconducting substrate 12 such as GaAs. However, the EMR sensor described in this invention is not restricted to III-V semiconductor materials. For example, it may also be formed on the basis of silicon. The heterostructure 20 includes a first layer 22 of semiconducting material having a first band-gap, a second layer 30 of semiconducting material formed on top of the first layer 22 and having a second band gap smaller than the first band gap, and a third layer 24 of semiconducting material formed on top of the second layer 30 and having a third band gap greater than the second band gap. The materials in first and third layers 22, 24 may be similar or identical. An energetic potential well (quantum well) is created by the first, second and third semiconducting material layers due to the different band-gaps of the different materials. Thus carriers can be confined inside layer 30, which is considered the EMR active film in the sensor 10.

The first layer 22 is typically formed on top of a buffer layer 26 that may be one or more layers. The buffer layer 26 comprises several periods of a superlattice structure that function to prevent impurities present in the substrate from migrating into the functional layers 22, 24 and 30. In addition, the buffer layer 26 is chosen to accommodate the typically different lattice constants of the substrate 12 and the functional layers of the heterostructure 20 to thus act as a strain relief layer between the substrate and the functional layers.

One or more doping layers are incorporated into the semiconducting material in the first layer 22, the third layer 24, or both layers 22 and 24, and spaced apart from the boundary of the second and third semiconducting materials. The doped layers provide electrons (if n-doped) or holes if (p-doped) to the quantum well. The electrons or holes are concentrated in the quantum well in the form of a two-dimensional electron-gas or hole-gas, respectively.

As described in the previously-cited references, the layers 22/30/24 may be a $Al_{0.09}In_{0.91}Sb/InSb/Al_{0.09}In_{0.91}Sb$ heterostructure grown onto a semi-insulating GaAs substrate 12 with a buffer layer 26 in between. InSb is a narrow band-gap semiconductor. Narrow band-gap semiconductors typically exhibit high electron mobility, since the effective electron mass is greatly reduced. Typical narrow band-gap materials are InSb and InAs. For example, the room temperature electron mobility of InSb and InAs are 60,000 $cm^2/Vs$ and 35,000 $cm^2/Vs$, respectively.

The bottom $Al_{0.09}In_{0.91}Sb$ layer 22 formed on the buffer layer 26 has a thickness in the range of approximately 1-3 microns and the top $Al_{0.09}In_{0.91}Sb$ layer 24 has a thickness in the range of approximately 10 to 1000 nm, typically 50 nm. The n-doping layers incorporated into layer 22 or 24 have a thickness from one monolayer (delta-doped layer) up to 10 nm. The n-doping layer is spaced from the $InSb/Al_{0.09}In_{0.91}Sb$ boundaries of first and second or second and third semiconducting materials by a distance of 10-300 Å. N-doping is preferred, since electrons typically have higher mobility than holes. The typical N-dopant is silicon with a concentration in the range of 1 to $10^{19}/cm^3$. The deposition process for the heterostructure 20 is preferably molecular-beam-epitaxy, but other epitaxial growth methods can be used.

A capping layer 40 is formed over the heterostructure 20 to protect the device from corrosion. The capping layer is formed of an insulating material such as oxides or nitrides of aluminum or silicon (e.g., $Si_3N_4$, $Al_2O_3$) or a non-corrosive semi-insulating semiconductor.

Two current leads 50, 52 and two voltage leads 60, 62 are patterned over one side of the EMR structure 20 so that they make electrical contact with the quantum well. A metallic shunt 70 is patterned on the side opposite the current and voltage leads of the EMR structure 20 so that it makes electrical contact with the quantum well. The applied magnetic field H, i.e., the magnetic field to be sensed, is shown by the arrows and is normal to the plane of the films in the EMR structure 20. The leads typically comprise metallic contacts, for example Au, AuGe, or Ge diffused into the device. The leads are typically formed after formation of the capping layer 40, and sometimes after removal of some of the capping layer material.

Figure 2:
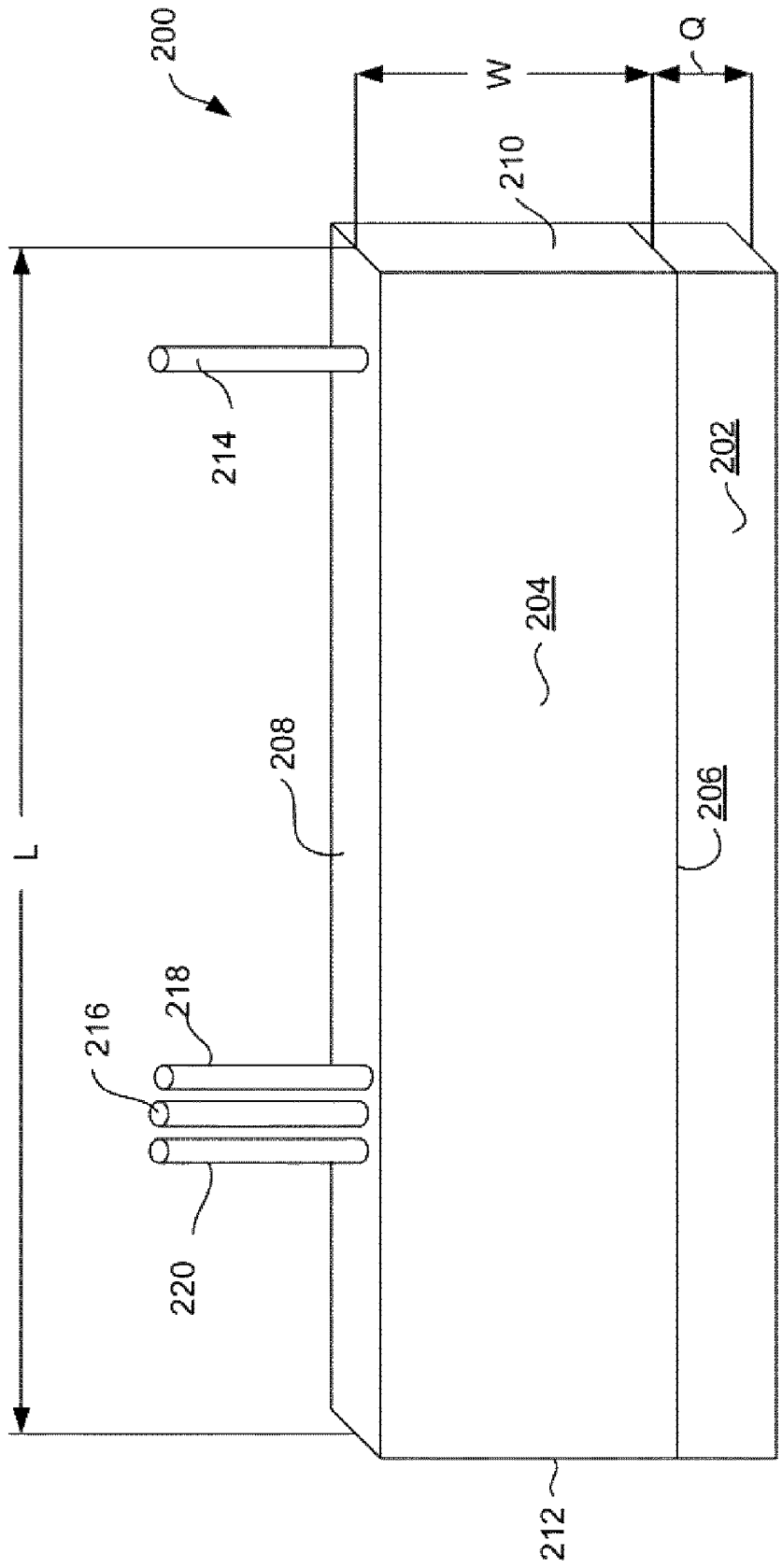
FIG. 2 is an isometric view of an EMR sensor according to a preferred embodiment of the present invention.

FIG. 2 illustrates an Extraordinary Magnetoresistive (EMR) sensor 200 according to a preferred embodiment of the invention. As shown, the sensor 200 includes a layer of electrically conductive material 202. The sensor 200 also includes a layer of semiconductor material 204 that has an edge that contacts the conductive layer 202 at an interface 206 and has an edge surface 208 opposite the interface 206. The semiconductor layer terminates at first and second ends 210, 212 defining a length L and has a width W. The layer of conductive material 202 preferably has the same length L as the semiconductor layer 204 and has a width Q.

The semiconductor layer 204 generally is a semiconductor heterostructure comprising a 2D electron or hole gas as described in the prior art. More specifically, a high mobility semiconductor such as InSb or InAs is employed. However, lower mobility materials may be appropriate for devices with L smaller than approximately the mean free path of the carriers. The electrically conductive layer 202 can be for example a metal, and can be any conducting metal, such as Au, that achieves an ohmic or nearly ohmic contact with the semiconductor. The metal conductivity should exceed that of the semiconductor in order to achieve a large magnetoresistance dRvv/Rii.

A contact resistance between the semiconductor layer 204 and the metal layer 202, will likely exist due to the band structure mismatch of the two materials and any interdiffusion that has occurred. The contact resistance may be in the range of 1E-8 ohm $cm^2$ to 1E-6 ohm $cm^2$. With continued reference to FIG. 2, the sensor 200 includes first and second current leads 214, 216, that are electrically connected with the edge surface 208 of the semiconductor layer 204 opposite the interface 206. The first current lead 214 is located near an end 210 of the semiconductor layer 204, whereas the second current lead 216 is located at about 2 L/3 from the same end 210. One of the leads, such as 214 is an input lead supplying current into the sensor 200, while the other lead 216 is an output lead conducting the electrical current back out of the sensor. However, the polarity of the leads 214, 216 is not critical, and lead 214 could be the output lead while lead 216 could be the input lead.

The inventors have found that locating the second current lead 216 some distance away from the end 212 results in a very large increase in magnetoresistance. This increase is maximized when the lead 216 is located about ⅔ of the distance from the opposite end 210 of the sensor 200. This arrangement is fundamentally different from the arrangement of current leads use in prior art devices, wherein the current leads were each positioned at or near the ends of the device.

Figure 3:
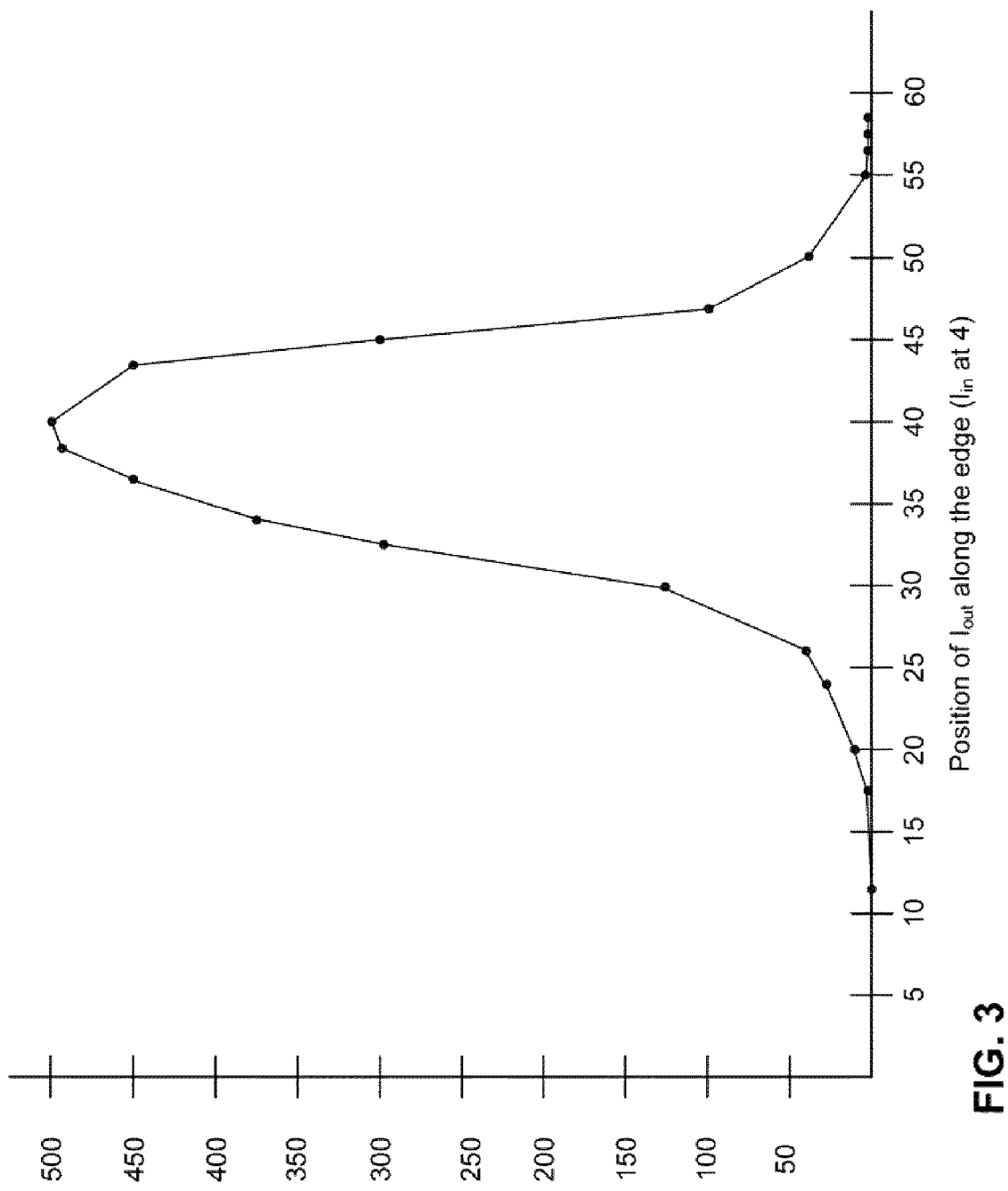
FIG. 3 is a graphical representation of the relationship between signal strength and current lead location.

FIG. 3 illustrates the relationship between signal strength (shown in arbitrary units) with respect to current lead placement. The length of the sensor can be seen as being divided into 60 equal increments. It can be seen from FIG. 3, that the maximum signal strength is achieved when one of the current leads is located about ⅔ of the distance along the sensor edge, or at "40" along the x axis of the graph. Although the positions of the current leads specify one of the leads being $I_{out}$ and the other being $I_{in}$, as mentioned above, the polarity is not critical and can be reversed.

With reference again to FIG. 2, the sensor 200 further includes first and second voltage leads 218, 220, electrically connected with the edge surface 208. As can be seen, the voltage leads are located at either side of the second current lead 216 and are located very close to the current lead 216. In fact the distance between the voltage leads 218, 220 are located as close to one another as possible without causing an electrical short between one of the voltage leads 218, 220 and the current lead 216. The distance between the voltage leads 218, 220 defines the track width of the sensor 200, and since a narrow track width is desired for maximum data density, the close spacing between the voltage leads 218, 220 provide exceptional signal resolution, and very small track width. The distance between the voltage leads 218, 220, therefore, is preferably not greater than 30 nm and is more preferably not greater than 20 nm. Of course, electrical isolation of the voltage leads 218, 220 from the current lead 216 must be maintained and further advances in lithographic and other manufacturing processes may allow the leads to be constructed even closer together.

In addition to exceptional signal resolution and narrow track width, the above described position of the voltage leads provides greatly increased magnetoresistance. As discussed above a magnetoresistive sensor detects magnetic field as a change in resistance of the sensor in response to the presence of a magnetic field. These changes in resistance are detected as voltages changes across the first and second voltage leads.

Figure 4A:
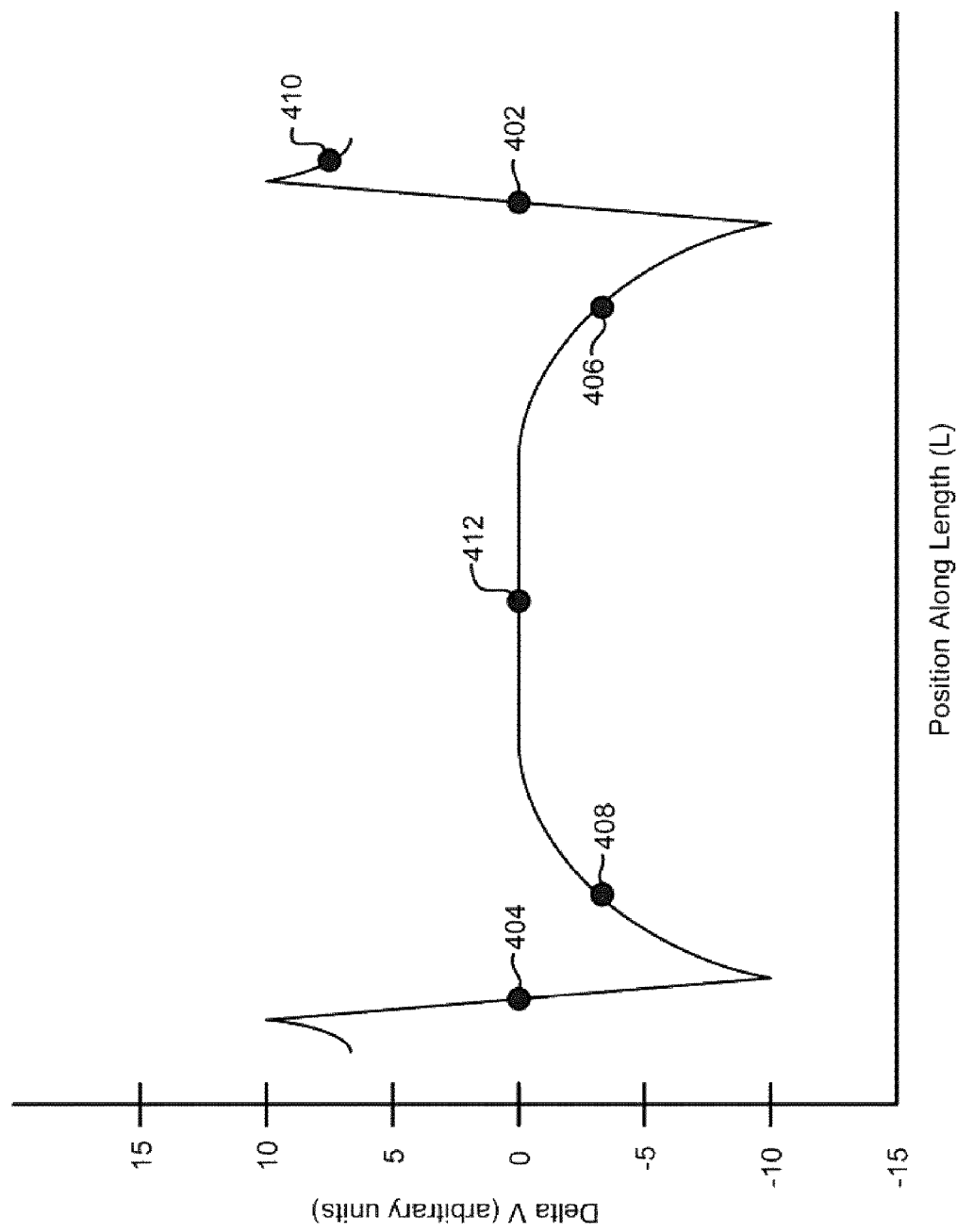
FIGS. 4A and 4B are graphical representations of the relationship between voltage and lead position along a length of a sensor according to the prior art (4A) and according to an embodiment of the invention (4B).
Figure 4B:
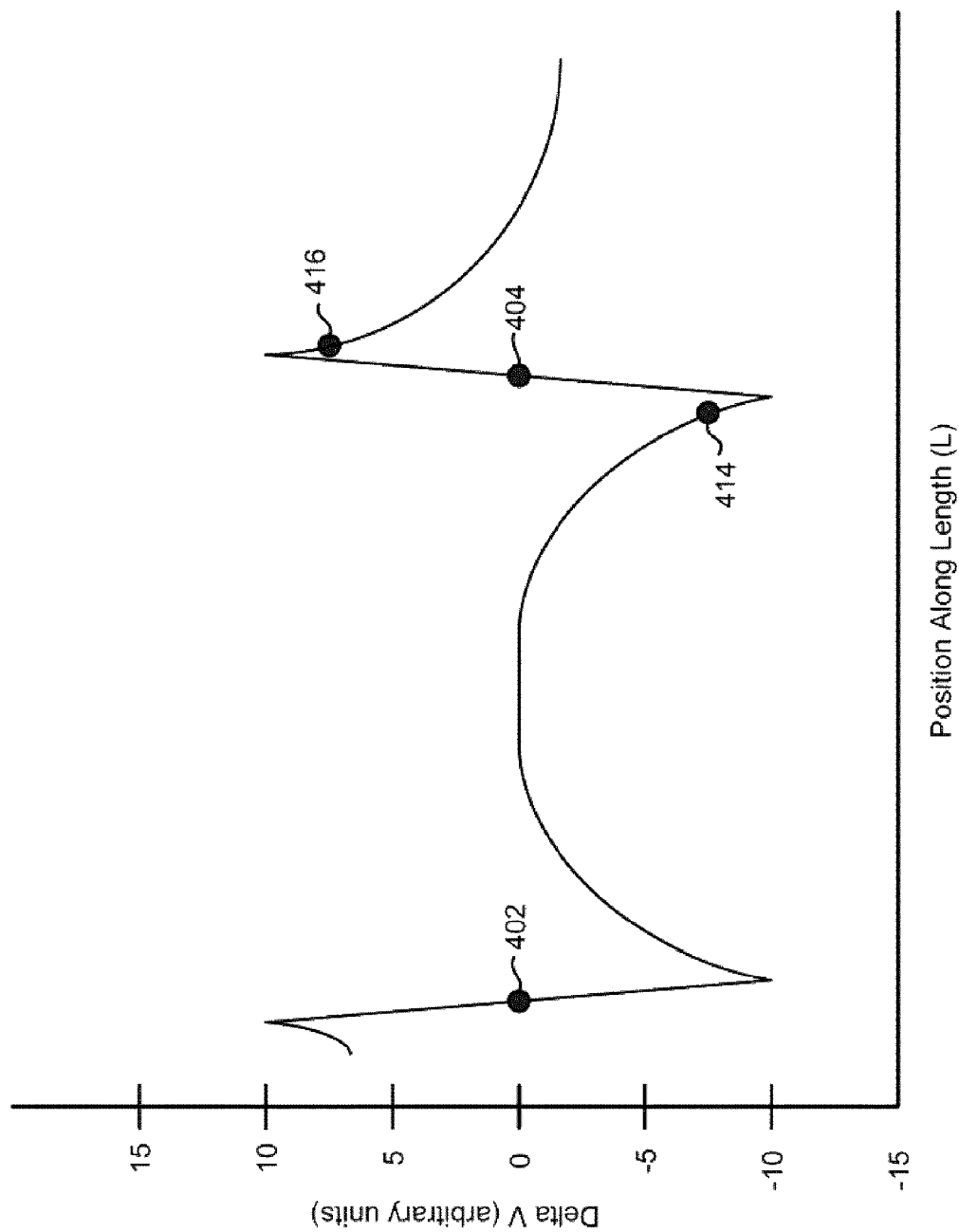

To better understand the exceptional dRvv/Rii performance provided by the lead configuration of the present embodiment, consider FIGS. 4A and 4B. Remembering that it is the voltage difference between two points on the sensor in response to a magnetic field that we are interested in measuring, FIGS. 4A and 4B illustrate the change in resistance at locations across the length of the sensor.

Locations 402 and 404 indicate the location of the first and second current leads 214, 216 on the sensor 200 (FIG. 2). With reference to FIG. 4A which illustrates prior art arrangements of voltage leads relative to current leads, one can see that if the voltage leads are both located at just inside the first and second current leads at locations 406, 408 very little difference in voltage will be detected. If one were to measure the voltage at a location just outside of one of the current leads, location 410 and also at the midpoint between the two current leads, location 412, a slightly larger voltage change would be detected.

However, with reference now to FIG. 4B which illustrates a possible voltage lead current lead arrangement according to an embodiments of the present invention, if one were to measure the voltage at either side of 404 employing leads at positions 414 and 416, an extremely large voltage difference can be detected. It should also be pointed out that, as discussed above, one of the current leads is located at a position 404 that is about ⅔ of the distance along the edge of the device as measured from one end to another. This placement of the voltage leads maximizes the signal and does so over a very small lateral distance, resulting in high spatial resolution. The placement of the voltage leads 218, 220 on either side of and very close to one of the current leads 216, therefore, provides two enormous benefits. First it provides a very large magnetoresistive signal. Second it allows the sensor 200 to have an extremely narrow track width, since the track width is only the distance between the voltage leads 218, 220.

Locating the triad of voltage/current/voltage leads 218, 216, 220 about ⅔ of the distance along the length (L) of the sensor provides a third advantage by further increasing the magnetoresistance of the sensor as discussed above. The distance between the voltage leads 218, 220 is only limited by the lithographic capabilities of forming the leads 216, 218, 220. Furthermore, the sensor is scalable in that the sensor can be made a small as the lithographic and other available manufacturing processes will allow, as long as the relative proportions of the sensor remain essentially the same.

With reference again to FIG. 2, in operation, a current is caused to flow from one of the current leads 214 to the other current lead 216. In the absence of a magnetic field the resulting electrical current will flow from the lead 214 directly through the semiconductor material to the conductive layer 202. It will flow through the conductive layer relatively very easily and then back through the semiconductor 204 to the other lead 216. The resistance in the absence of a magnetic field will then be essentially twice the resistance through a width W of the semiconductor material.

In the presence of a magnetic field, the Hall effect on the charge carriers causes more of the current to flow through the semiconductor material 204 without passing through the electrically conductive layer 202. Since the semiconductor layer has a much higher resistance than the electrically conductive layer 204 this will result in a much higher resistance through the sensor, which can be read as a signal as described above.

In order to achieve desired exceptional performance, the semiconductor layer 204 preferably has proportions such that W/L is between 1/60 and 1/5 and can be about 1/10. The distance between the voltage leads 218, 220 for magnetic read sensor applications should be chosen to be about the same as the data track width and is preferably L/15. The voltage leads 218, 220 are preferably each separated from the current lead by a distance of about L/30 or less. As the signal detected across the voltage probes depends on the spacing between the voltage leads 218, 220, this spacing should not be greater than 33% of the track width (1.33×L/15).

However, the minimum lithographically attainable feature size and the finite width of the voltage and current leads result in being able to locate the voltage leads 218 and 220 only a minimum distance away from the second current lead 216 in order to avoid shunting. A typical voltage edge to current edge separation possible today is about 30 nm, making the device potentially able to measure a 60 nm by 60 nm area. Improvements in lithography techniques that will accompany any improvements in areal density will make even smaller areas of high sensitivity possible.

However larger separations may also be of advantage if low cost or other applications with much lower resolution are considered. Thus the typical voltage to current lead separation measured edge to edge should be in the range of 30 nm and 3 µm. Of course the length of the sensor L will also be determined by this separation and will approximately be about 10-30 times larger than the edge-to edge separation of the voltage leads and second current lead. The length of the sensor would typically be in the range 300 nm to 90 µm., but can be as large as millimeters for some sensor applications.

It should be appreciated that the materials making up the sensor can be such that the current flow between the current leads 214, 216 is primarily by charge carriers that are electrons or can be chosen so that the charge carriers are primarily holes. In addition, as mentioned above the current flow can be in either direction between the leads 214, 216.

A method that can ensure the proper placement of the voltage leads relative to the current leads is to define the semiconductor layer 204, electrically conductive layer 202 and the leads 214, 216, 218, 220 in a single masking making all features from the same material. In this manner the voltage and current probes are self aligned. After patterning of the sensor 200 further lead layers can be aligned to the sensor structure 200. It is understood that other methods for forming the sensor can be employed.

Integrated Servo and Read Sensor EMR Device

Two dedicated EMR devices (sensors) are employed in an embodiment of the invention: one for reading data from a magnetic domain(s) of interest and one for servo operations, i.e., positioning the read sensor over the magnetic domain(s) of interest. The sensors are preferably configured in an abutted configuration. High spatial resolution of the sensor elements comprising an embodiment of this invention can be achieved by matching the spacing between the probe leads that detect the magnetic excitations from the recorded medium, as well as making the width of the semiconductor stripe to be of comparable dimensions to the track width being read (for the read sensor) and to the recorded information needed to be sensed for servo operations.

Figure 5:
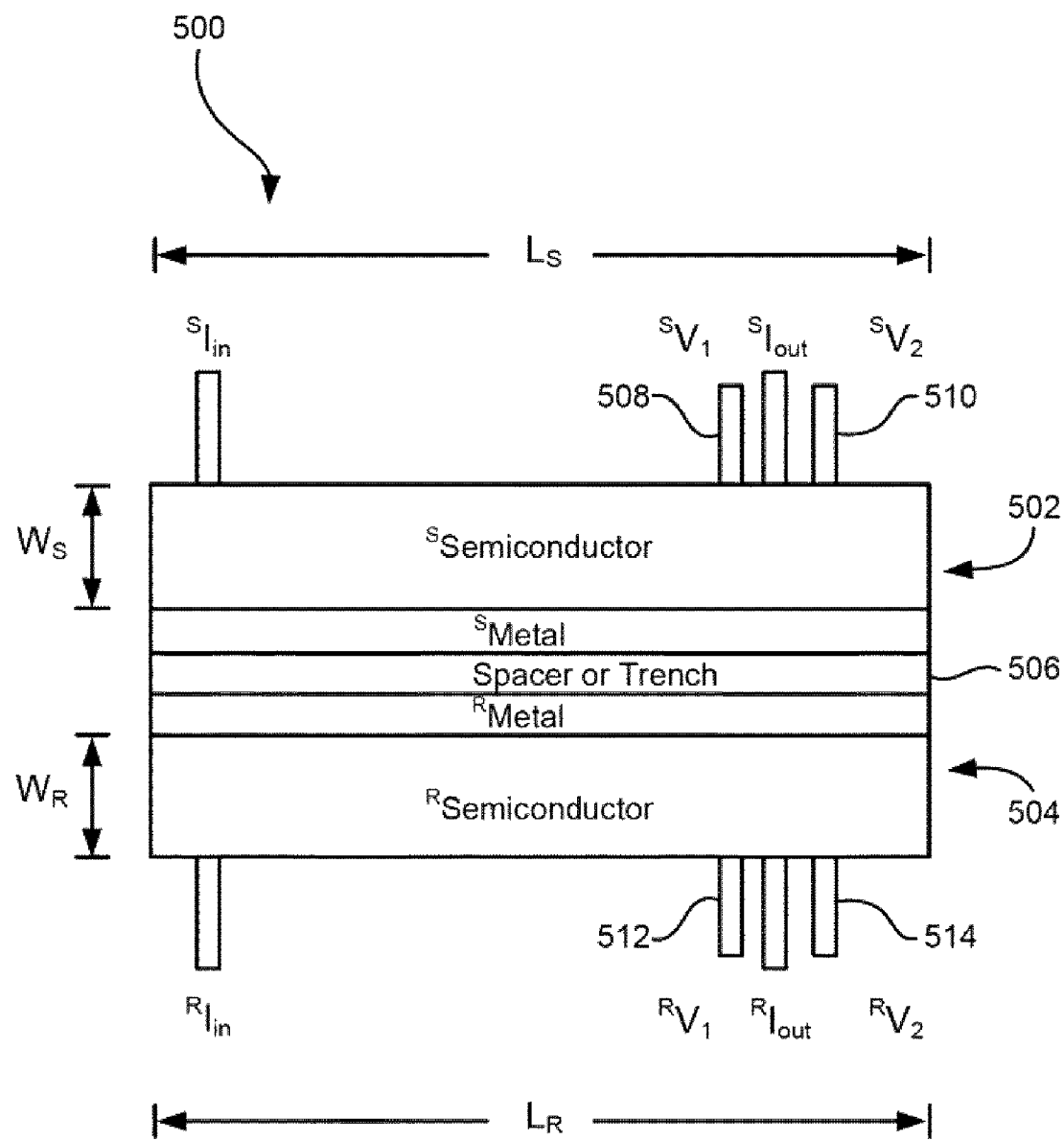
FIG. 5 is a side view of an integrated servo and read sensor EMR device according to one embodiment.

A basic embodiment of an integrated servo and read sensor EMR device 500 for magnetic recording is shown in FIG. 5. As shown, two narrow track EMR sensors 502, 504 are fabricated so that they are electrically isolated by a spacer layer 506 that hinders the transport of charge from one device to the other. The spacer 506 can be formed of alumina or other electrically nonconductive material. Note that the spacer 506 could also be a lithographically defined trench that also electrically isolates the sensors 502, 504.

The ancillary electronics for operating the sensors 502, 504 as well as for executing the reading and servo operations are not shown, however as known to those skilled in the art, it could involve separate dedicated components for reading and servoing, and/or some of these components could also be shared. The spacing between the voltage leads ($V_1$, $V_2$) 508, 510, 512, 514 and their location along the edge of the semiconductor, determines the spatial resolution of the device, as discussed above. The $V_1$-$V_2$ spacing for the read sensor 504 is chosen to be about the same as the track-width dimension to achieve the highest spatial resolution with high sensor signal. The dimension W (width of the semiconductor stripe) for the read sensor 504 is also matched to the size of the minimum on-track bit length. This provides a very sensitive read detector which is mag-noise free, requires no shields and is suitable for detection of nanoscopic magnetic domains. The corresponding spacing of $V_1$-$V_2$ for the servo sensor 502 is preferably adjusted to optimize the servo scheme employed (i.e.: servoing either by using die signal from the track being read/written to or from adjacent tracks) and to take care of skew angle issues when a conventional arm suspension is employed to translate the read/servo device between the inner diameter (ID) and the outer diameter (OD) of the media.

In FIG. 5, the subscripts R and S are employed to identify the EMR components for the Servo and Read devices which include the semiconductor and metal shunt materials, as well as the current and voltage leads for each sensor. (Note FIG. 2.) For simplicity, in FIG. 5, both EMR elements 502, 504 are drawn having identical dimensions for the servo and read components. However, as indicated by the symbols $W_R$, $L_R$ and $W_S$ and $L_S$ (where W denotes width and L denotes length), the size of each component as well as the materials involved can be adjusted to optimize the performance of each sensor 502, 504 in the integrated device 500. Examples of choices on the geometrical arrangement of the voltage probes are taught in this disclosure while describing the preferred embodiments.

Figure 6A:
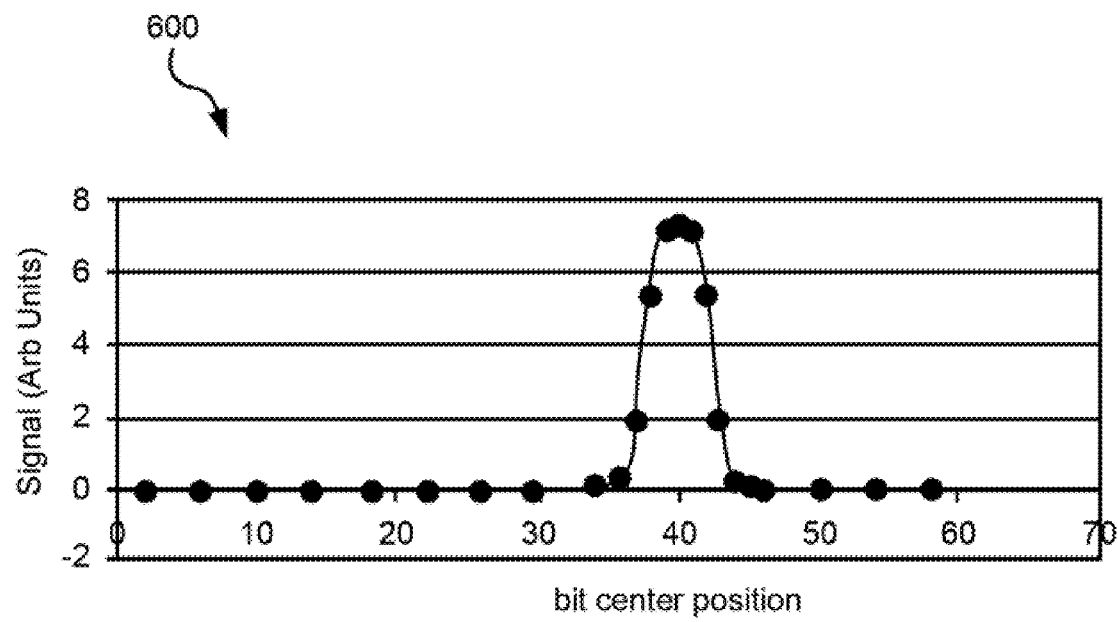
FIGS. 6A and 6B are graphical representations of a signal response to a 50 mT excitation of the EMR (read or servo) components of the integrated device according to one embodiment.
Figure 6B:
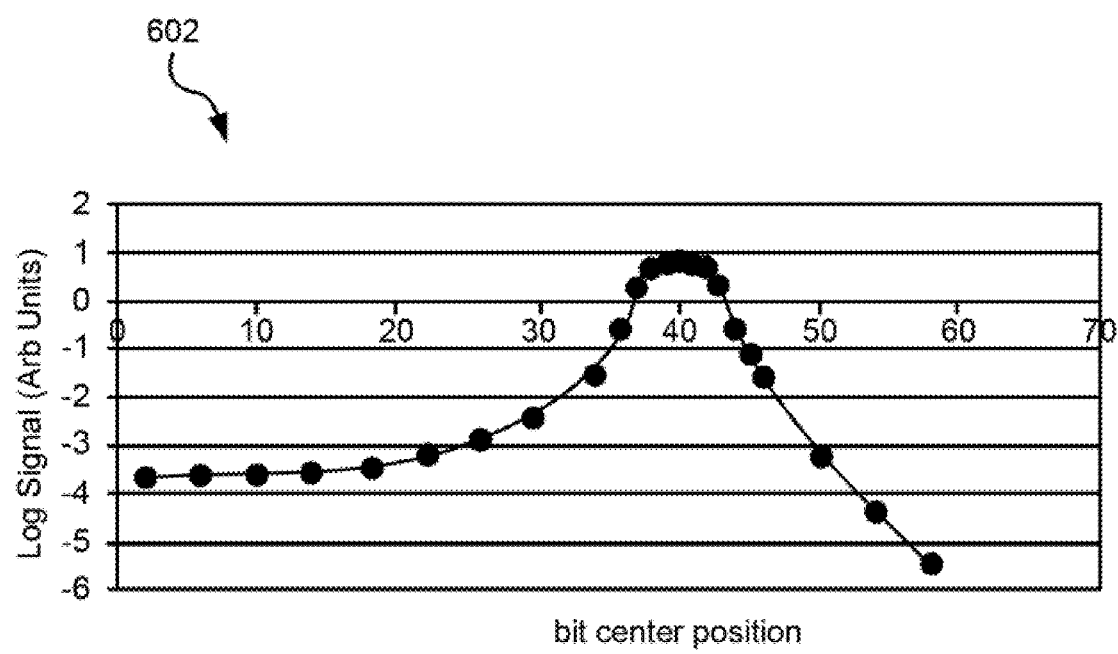

The next consideration is the exceptionally high spatial resolution provided by the sensors of an embodiment of this invention. In FIGS. 6A-6B, the calculated signal response of an unshielded EMR sensor to a magnetic bit of width comparable to the $V_1$-$V_2$ spacing is illustrated. The $I_{out}$ current lead is placed at position 40 (i.e.: x=2 L/3) of a device in which L=60 nodes. The magnetic excitation is confined for this calculation within the $V_1$-$V_2$ probe leads and the graph gives the signal response to a field of 50 mT emanating from the magnetic bit as a function of the position along the semiconductor edge. The bit dimension in the calculation is 5 L/60×L/15. The response of the sensor is plotted both in linear-linear (chart 600, FIG. 6A) and log-linear schedule (chart 602, FIG. 6B) and it illustrates the high spatial resolution provided by such sensors as that described above with respect to FIG. 2.

In addition to the superior sensor attributes already described, no mag-noise and high spatial resolution, the planar geometry and flexibility of fabrication of the integrated device here disclosed permits unique applications for magnetic data storage, magnetometry and imaging technologies. An illustrative magnetometer or imaging system includes a chuck for holding a workpiece and an actuator that is capable of moving the sensor in a rasterized pattern over the workpiece to read the magnetic topography of the workpiece. A sensor according to an embodiment of the present invention may also be useful in other devices requiring a high sensitivity, high resolution sensor.

Some examples of the integrated EMR device are now described.

1) On-Track Reading and Servoing

Current-art servo techniques employ sector servo approaches whereby servo information is written on each track across the entire addressable surface of the recording medium. The servo sector typically comprises marks for calibrating the head response (Automatic Gain Control, AGC), synchronization (Sync), Cylinder labelling (Cyl) and Position Error Signal (PES). Approximately the mark length of the sector servo corresponding to AGC, SYNC, CYL and PES is 30%, 10%, 25% and 35%. It is also noted that the sector servo information consumes between 10% to 15% of the recordable disk capacity. Whereas, this servo approach works well for current products, one can expect severe limitations of its usefulness for data drives operating at >0.5 Tb/in². One severe limitation of current-art servo schemes is the fact that during the write and read operation, the read/write sensor moves in an open loop mode. All positioning information pertaining to spatial location of the data track is acquired while traversing the servo sector zones. For this scheme to work at the Tb/in² level, either very stringent requirements on island position error tolerance (~3-6 nm for 0.6 Tb/in²) will be needed, or it will be necessary to substantially increase the frequency of the sector servo marks around the track to improve head position accuracy which will result in significant reductions of the user data storage capacity.

Figure 7:
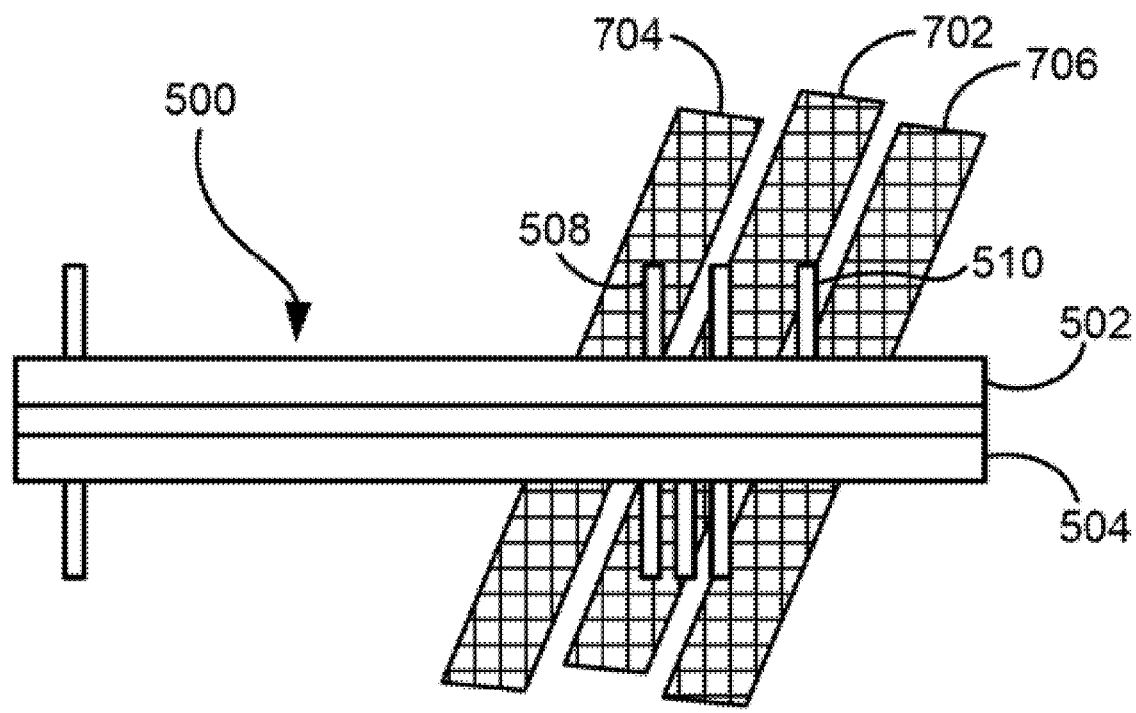
FIG. 7 illustrates a configuration of an integrated servo and read sensor designed to compensate for skew.

The integrated device of FIG. 5, in which the read and sensor elements are fabricated to lie on the same axis of the data track being written or read, permits closed-loop real time precision adjustments of the read sensor position during write or read operations by processing the signal derived from the sensor portion of the device. In this scheme, all or preferably only a portion of the servo information is written on the tracks. PES marks could be eliminated and the servo information could be limited to SYNC and CYL information. This would result in 65% reduction of the storage capacity currently dedicated to servo information. Furthermore, by having the servo sensor positioned ahead of the read sensor, servo operations during reading and writing are enabled. Skew angle issues are readily dealt with by controlling the separation between the sensors (adjusting the width of the spacer layer and metal shunts of the device 500 shown in FIG. 5) and as shown in FIG. 7 by adjusting the separation of the voltage probes 508, 510 in the servo sensor component 502. Particularly, the spacing of the voltage leads 508, 510 in the servo component 502 is increased to fully detect the signal from the track 702 being read, In the example shown in FIG. 7, the track spacing is such that increasing the $V_1$-$V_2$ gap allows a portion of the adjacent tracks 704, 706 to be also sensed. This may be undesirable and hence to avoid interference from adjacent tracks, said spacing could be kept constant, albeit, with a concomitant reduction of the signal amplitude derived from the servo sensor. For example, for a skew angle of 12 degrees and for recording at 1 Tb/in² with rectangular 15 nm×15 nm bits and a bit spacing (center to center) of 25 nm, die servo sensor 502 would detect 50% of the signal amplitude while keeping die $V_1$-$V_2$ spacing identical to the read sensor 504 (may be desirable for optimum spatial resolution) by making the combined metal shunt and spacer thickness to be 34 nm.

Although it is not the objective of this invention to teach the signal processing and ancillary electronics required to derive a robust servo signal, it suffices to say that similar schemes known in the art to generate error signals from servo mark detection can be employed to precisely control the read sensor position through a close-loop scheme driving the voice coil actuator of the arm. For example, referring to FIGS. 6A-B, one clearly sees that the signal amplitude rapidly falls off when the magnetic excitation (bit) is located outside the region between the voltage probes, therefore, peak detection of the servo signal can be used to control the head position. Additional improvements for deriving a robust servo signal could be attained by using differential amplifiers and the signal output from both the read and servo sensor elements. Such schemes make possible the realization of two key advantages of an embodiment of this invention for magnetic recording: active servo operation during read/write operations and increments in the recordable recording capacity available to the end user.

It is here noted that prior-art inventions which seek to control the position of the read head with respect to the information track being followed, employ solutions whereby two side-by-side read magnetoresistive elements are formed to read portions of the track being followed. (See U.S. Pat. Nos. 3,246,307; 3,918,091 and 4,012,781.) Whereas this solution may work well for low density recording, it is impractical for current and future areal densities. An alternative solution is suggested in U.S. Pat. No. 5,568,331 whereby two side-by-side magnetoresistive elements are employed: one is dedicated to read the information of the desired track, whereas the other element is employed for servoing. Embodiments of this invention require a recording medium containing lands and grooves and the data of interest is recorded on the lands, whereas the servo information is recorded on the grooves. As it is appreciated by those skilled in the art, this solution sacrifices user end capacity and is also impractical for $Tb/in^2$ recording and beyond.

2) Servoing from Adjacent Tracks

Figure 8:
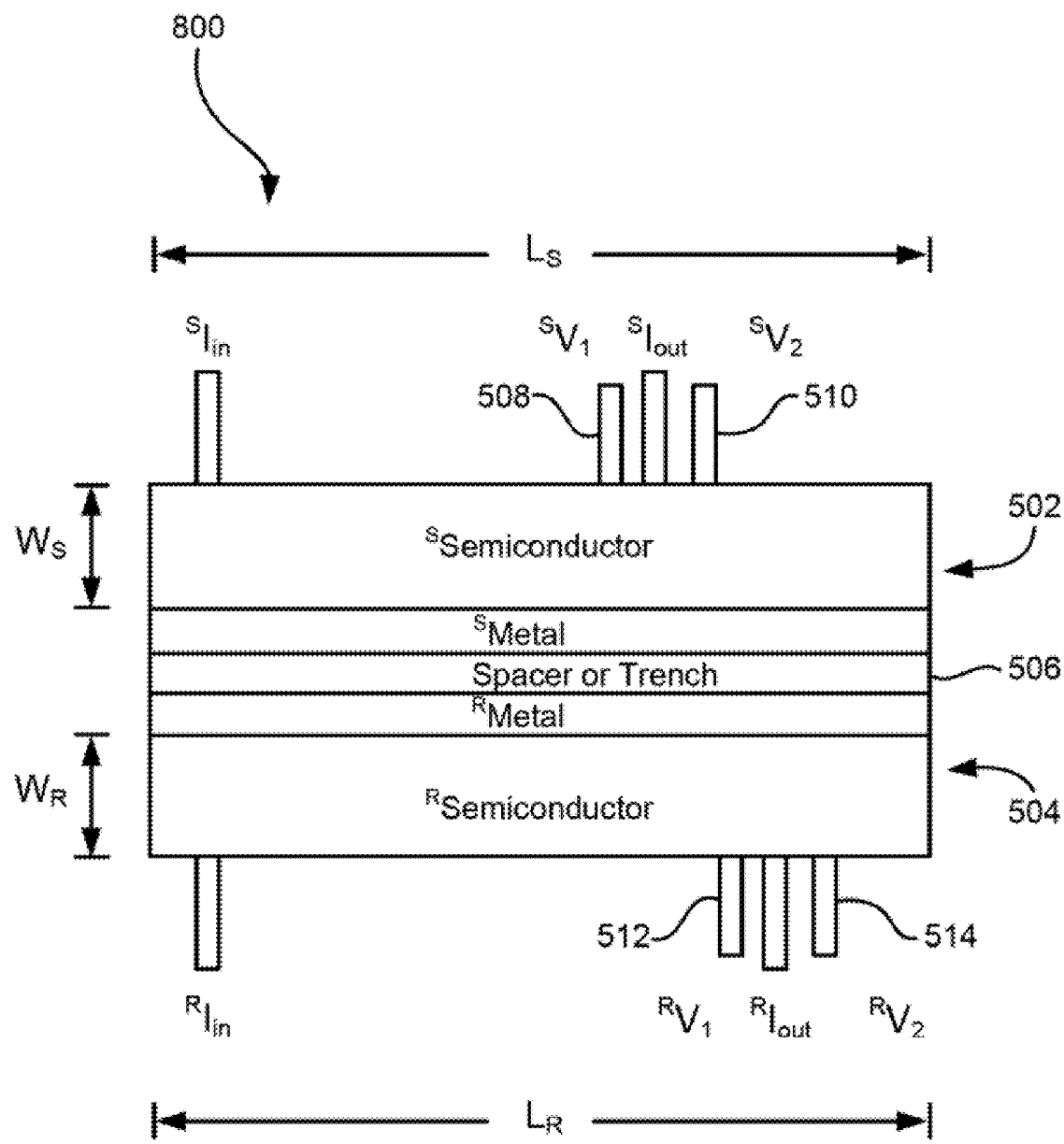
FIG. 8 is a side view of an integrated EMR device for servoing on data off-track employing sensors collinear in the disk tangential direction.
Figure 9:
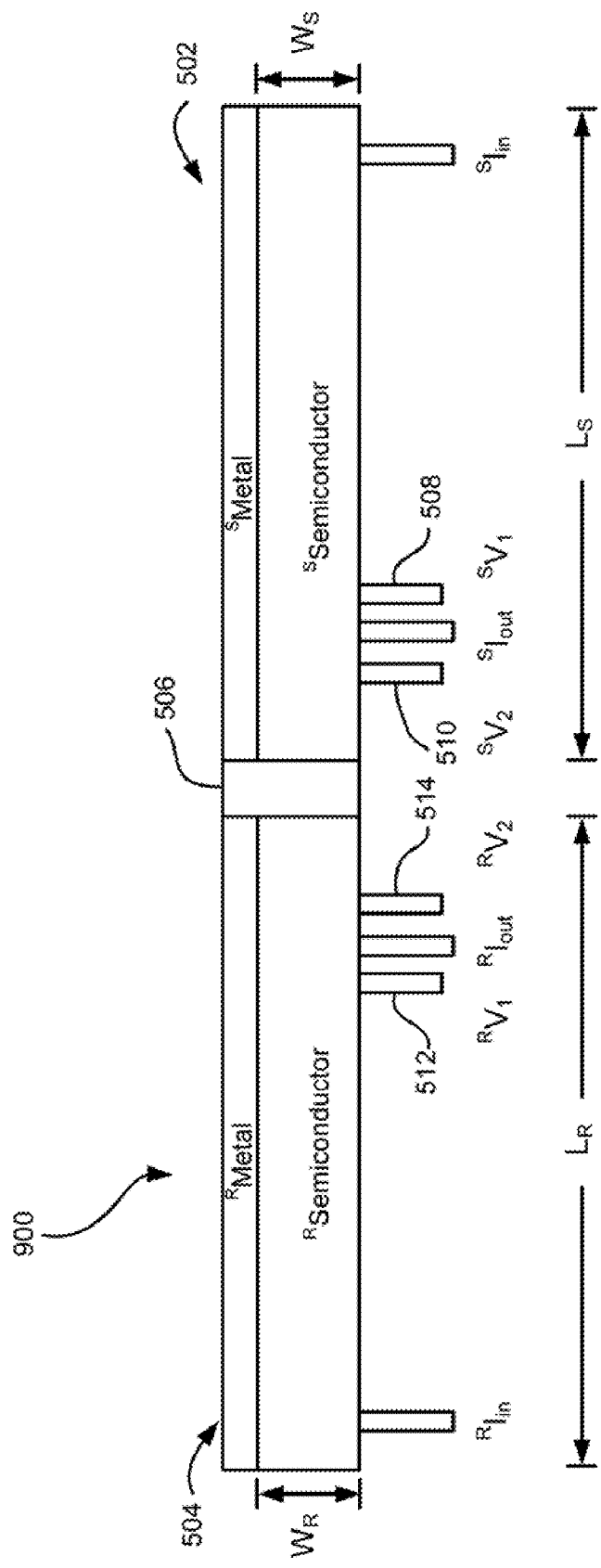
FIG. 9 is a side view of another integrated EMR device for servoing on data off-track employing sensors collinear in the disk radial direction.

For some applications it may be preferable to servo off adjacent track information. Furthermore, as taught later in this disclosure, additional gains in storage density are permitted by such schemes. FIGS. 8 and 9 show possible configurations for the Integrated Read and Servo EMR Sensor 800, 900. FIG. 8 shows a device 800 whereby the read and servo sensors 504, 502 are fabricated so that they are collinear with respect to the tangential direction of the recording medium motion. The position of the corresponding voltage probes 508, 510 for the servo sensor 502 are laterally displaced with respect to those of the read sensor 504. The displacement is determined by the track density and the choice of the track whose information is to be used for servo control. It is to be understood that EMR sensors offer the highest magnetoresistive response for large ratios of L/W (10-40), the actual value is defined by the material properties of the semiconductor and shunt materials employed. Hence these devices are highly elongated along the edge of the semiconductor probes. As the response of an EMR device is constant for a given W/L ratio, this design gives additional flexibility for improving the geometry and material properties independently from the read sensor to provide the most robust servo signal. In other words, the L values for the read and servo sensors could significantly vary to meet an optimum design consistent with the track density requirements. An additional benefit in tracking off adjacent tracks is that locating the voltage probes from the two sensors on a line roughly perpendicular to the down-track direction allows the device to maintain a probe spacing identical to the read sensor without sacrificing signal amplitude while at the same time taking care of skew effects.

In FIG. 9, an alternative arrangement of an integrated device 900 for servo operations employing information on adjacent tracks is shown. In this case, the sensors 502, 504 are fabricated in a "side-by-side" configuration with a spacer 506 or trench therebetween.

The spacer thickness (or trench width) and the position of the voltage probe leads 508, 510 on the servo sensor element 502 is used to determine the track that will be used for servo operations. Advantages of this configuration over servoing off data on track have already been outlined while describing FIG. 8. In addition, the configuration of FIG. 9 may be easier to fabricate than that shown in FIG. 8. It is noted that consistent with the teachings of the EMF sensor description (above), the highest signal response is obtained when the voltage leads are placed at about 1/3 L. Hence, if maximum signal response for both the read and servo sensors are required, it may not be possible for this configuration to be used for tracking of the N+/−1 track while reading or writing track N.

A major advantage of these servo configurations that rely on servo operations based on data readout from adjacent tracks is that it is no longer required to write the servo information on every track on the disk surface. For example if one desires to servo off an adjacent track, the servo information needs to be written on every other track plus the outermost OD and ID tracks. This results in a net reduction of 2× of the storage capacity currently dedicated to servo information. Furthermore, if as indicated in describing the advantages of on-track servoing above one can dispose of the AGC and PES servo signal components, the overall reduction of the recordable area dedicated to servo tracking in current-art hard disk drives enabled by an embodiment of this invention could be as large as ~5.7×. The gains could be even higher if the N+/−x (x=2, 3, 4 . . . ) are employed for servo signal generation. Returning to the case where one servo tracks from the N+/−1 track, said track would contain the necessary components of the servo sector signal to identify the cylinder needed to be addressed and the synchronization. If in the first seek operation, the servo sensor landed on a track containing no servo information, a simple iterative process instructing the position motor to jump +/−1 track would be sufficient to move the sensor to the track containing the servo information.

3) Magnetic Domain Location Sensor

Whereas in this disclosure, the operation and advantages of an embodiment of the invention have been described mostly citing patterned media as the recording medium, it is to be understood that an embodiment of the present invention is also applicable to other recording media classes and it solves some the roadblocks in employing such material classes for ultrahigh density recording. Self-assembled magnetic materials, highly segregated granular media (with narrow grain size distributions) and media grown oil porous templates have been suggested in the literature as potential solutions for ultrahigh density recording. One common pitfall shared by these approaches which hinders their implementation is the variability of the island (grain) position along the track direction. The device here disclosed through one or more of the preferred embodiments here described, can be used in combination with recording materials having such island positioning error to help identify or locate the physical location of the island to be recorded or read. Together with electronics, channels and codes to handle asynchronous data writing and reading, an embodiment of the invention here disclosed permits recording at very high densities without the need to employ costly lithography with stringent island positioning requirements.

4) Multi-Channel Magnetic Recording

The planar fabrication geometry of the EMR sensors of an embodiment of this invention, the ability to dispense with the need for shields and the absence of magnetostatic interactions between the sensors (no ferromagnetic materials are employed) opens up the possibility of multi-channel magnetic recording in hard drive disk environments. An array of judiciously fabricated narrow track sensors as taught herein can be employed to simultaneously address a plurality of data tracks, thereby increasing the read data rate. Adding additional write elements will in addition increase also the write data rate.

Figure 10:
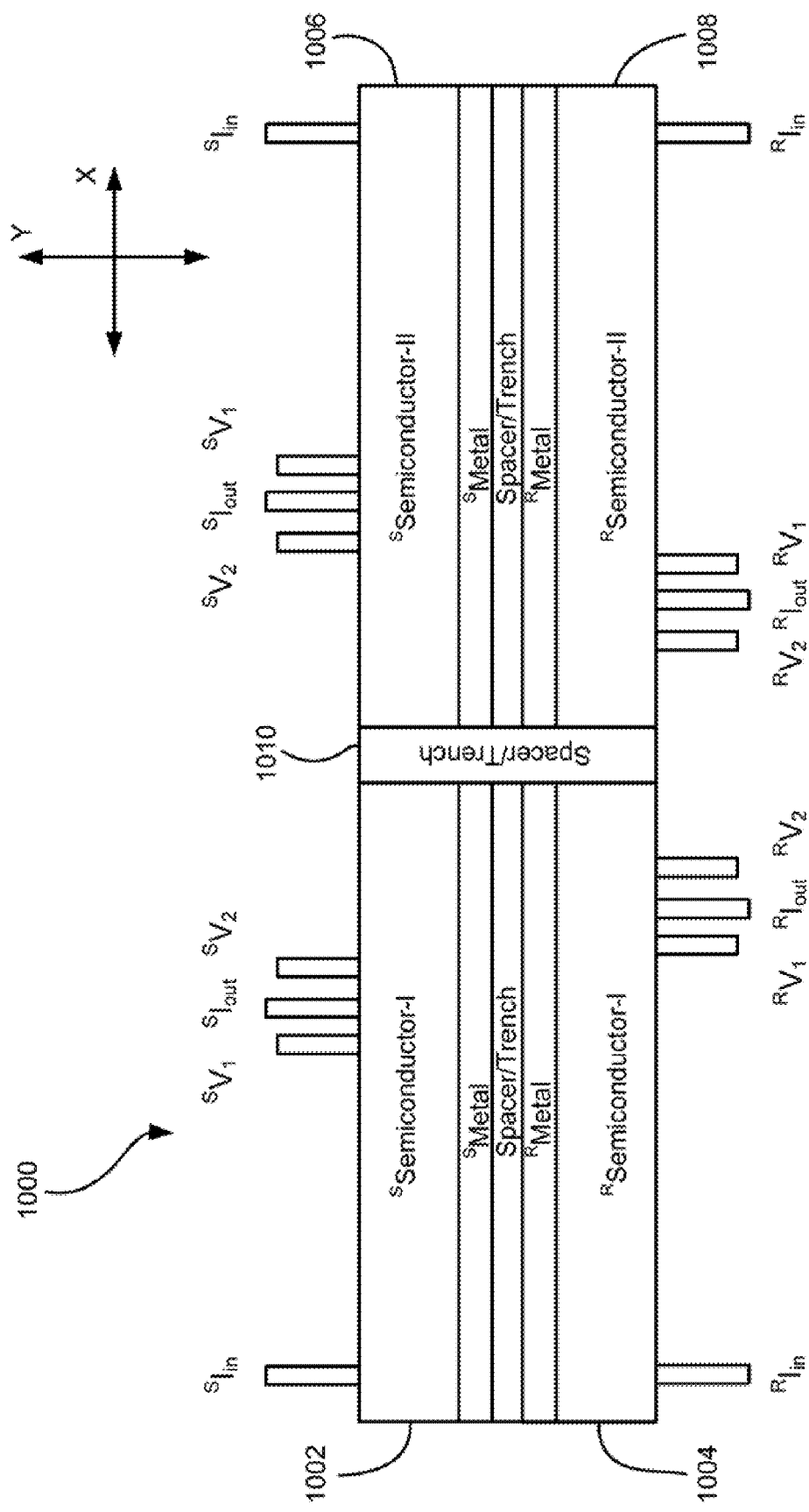
FIG. 10 is a side view of an integrated EMR device array for multi-channel magnetic recording.

FIG. 10 illustrates an embodiment 1000 for multi-channel magnetic recording whereby four co-planarly fabricated EMR sensors 1002, 1004, 1006, 1008 which are electrically isolated by a suitable spacer (trench) 1010 are employed to simultaneously read data from adjacent tracks (e.g., using the R sensors 1004, 1008 at the bottom of the figure). In this embodiment the EMR sensors at the top of the figure (the S sensors 1002, 1006 at the top of the figure) are employed for servoing from the tracks immediately to the left and right of the tracks being read.

It will be obvious to those skilled in the art that the sensor configuration illustrated in FIG. 10, can be readily extended in both x and y coordinates of the plane of the structure as shown to comprise a plurality of EMR sensors to further increase the number of detectors in the array. Such novel arrays can be used to expand the number of data tracks that can be simultaneously read, thereby further increasing the read-data rate. For example, if the servo sensors in the array shown in FIG. 10 are employed to read data, said array would permit simultaneous readout from four adjacent data tracks. Servo control with such an array could be achieved by servoing off the read data and comparing the signal amplitudes from the four independent read sensors to control the actuator for accurate head positioning.

Extending the array shown in FIG. 10 in the x direction (horizontal plane) allows, for example, doubling the number of sensors illustrated in FIG. 10 from four to six, eight, etc. In such configuration, in addition to allowing more than doubling the potential for read data rate, the freedom also exists to use some of the sensors to obtain servo information while simultaneously using others to read data. As an example consider an array where every other adjacent sensor in the same plane of the semiconductor are alternately read and servo sensors, thereby widening the applications of said EMR device arrays in magnetic storage.

Disk Drive System

Figure 11:
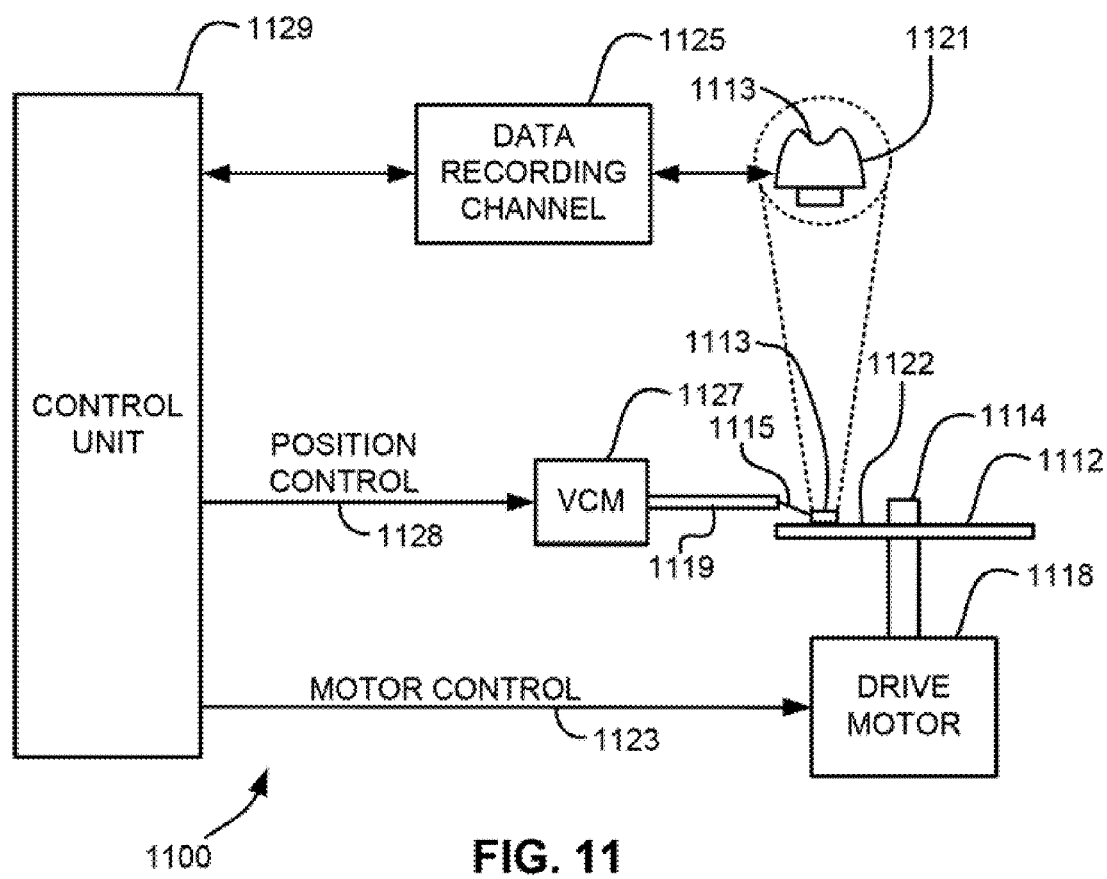
FIG. 11 is a simplified system diagram of a disk drive system in which the invention might be embodied.

Referring now to FIG. 11, there is shown a disk drive 1100 embodying the present invention, according to one embodiment. As shown in FIG. 11, at least one rotatable magnetic disk 1112 is supported on a spindle 1114 and rotated by a disk drive motor 1118. The magnetic recording on each disk is in the form of an annular pattern of concentric data tracks (not shown) on the disk 1112.

At least one slider 1113 is positioned near the disk 1112, each slider 1113 supporting one or more magnetic read/write heads 1121. Each read/write head includes a integrated servo and read sensor EMR device. As the disks rotate, slider 1113 is moved radially in and out over disk surface 1122 so that heads 1121 may access different tracks of the disk where desired data are recorded. Each slider 1113 is attached to an actuator arm 1119 by means of a suspension 1115. The suspension 1115 provides a slight spring force which biases slider 1113 against the disk surface 1122. Each actuator arm 1119 is attached to an actuator means 1127. The actuator means 1127 as shown in FIG. 11 may be a voice coil motor (VCM). The VCM comprises a coil movable within a fixed magnetic field, the direction and speed of the coil movements being controlled by the motor current signals supplied by controller 1129.

During operation of the disk storage system, the rotation of disk 1112 generates an air bearing between slider 1113 and disk surface 1122 which exerts an upward force or lift on the slider. The air bearing thus counter-balances the slight spring force of suspension 1115 and supports slider 1113 off and slightly above the disk surface by a small, substantially constant spacing during normal operation.

The various components of the disk storage system are controlled in operation by control signals generated by control unit 1129, such as access control signals and internal clock signals. Typically, control unit 1129 comprises logic control circuits, storage means and a microprocessor. The control unit 1129 generates control signals to control various system operations such as drive motor control signals on line 1123 and head position and seek control signals on line 1128. The control signals on line 1128 provide the desired current profiles to optimally move and position slider 1113 to the desired data track oil disk 1112. Read and write signals are communicated to and from read/write heads 1121 by way of recording channel 1125.

The above description of a typical magnetic disk storage system, and the accompanying illustration of FIG. 11 are for representation purposes only. It should be apparent that disk storage systems may contain a large number of disks and actuators, and each actuator may support a number of sliders.

Scanning Magnetometer and Imaging System

Figure 12:
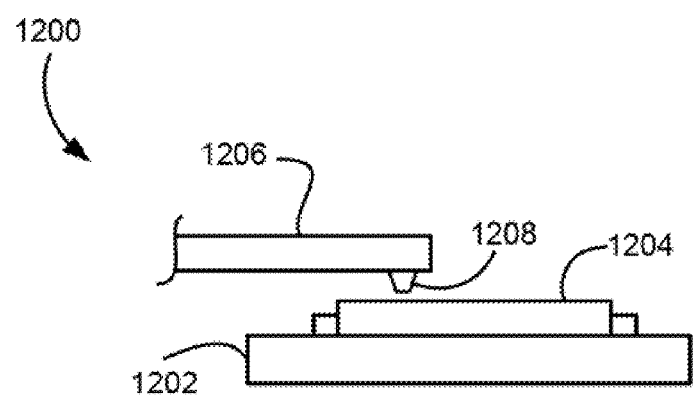
FIG. 12 depicts an illustrative magnetometer or imaging device.

FIG. 12 depicts an illustrative magnetometer 1200 that includes a chuck 1202 for holding a workpiece 1204 and an actuator 1206 that is capable of moving a sensor 1208 as described above in a rasterized pattern over the workpiece 1204 to read the magnetic topography of the workpiece 1204. An illustrative imaging system would have a similar or identical configuration.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A system, comprising:
   a first Extraordinary Magnetoresistive (EMR) device for detecting magnetic fields of a magnetic domain of interest, the first EMR device comprising:
      a layer of electrically conductive material;
      a layer of semi-conductor material formed adjacent to and contacting the layer of electrically conductive material, the layer of semi-conductor material having an edge surface opposite the electrically conductive material and having first and second ends separated by a length (L);
      first and second electrically conductive current leads, in electrical communication with the semi-conductor material; and
      first and second electrically conductive voltage leads in electrical communication with the semi-conductor material, the second current lead being located between the first and second voltage leads; and
   a second EMR device for deriving servoing information for positioning the first EMR device over the magnetic domain of interest.

2. A system as recited in claim 1, wherein the EMR devices are electrically isolated from each other by an electrically nonconductive spacer or a void.

3. A system as recited in claim 1, wherein the second EMR device is designed for generally collinear and tangential alignment with a single magnetic domain track for deriving servoing information from the magnetic domain track.

4. A system as recited in claim 1, further comprising multiple first EMR devices for simultaneously detecting magnetic fields of magnetic domains of interest; and multiple second EMR devices for deriving servoing information for positioning the first EMR devices over the magnetic domains of interest.

5. A system as recited in claim 1, wherein voltage leads on the second EMR device are laterally translated with respect to a center axis of the first EMR device.

6. A system as recited in claim 1, wherein voltage leads on the second EMR device are spaced farther apart than the voltage leads of the first EMR device.

7. A system as recited in claim 1, wherein the second EMR device derives servoing information from a magnetic domain track other than the magnetic domain being detected by the first EMR device.

8. A system as recited in claim 1, wherein voltage leads of the second EMR device are displaced, with respect to the voltage leads of the first EMR device, by at least a width of one full magnetic domain track and/or one or more guard bands.

9. A system as recited in claim 1, wherein a voltage lead location of the second EMR device enables the second EMR device to derive servoing information from a N+x magnetic domain track, where N is the magnetic domain track being detected by the first EMR device, and where x is greater than 1.

10. A system as recited in claim 1, wherein at least one of a length (L) and width (W) of the second EMR device is different than a L or W of the first EMR device.

11. A system as recited in claim 1, further comprising at least a third EMR device for detecting magnetic fields of at least a second magnetic domain of interest.

12. A system as recited in claim 1, wherein the first and second voltage leads are each separated from the second current lead by a distance of about the size of the magnetic region or bit to be resolved or imaged.

13. A system as recited in claim 1, further comprising magnetic media containing magnetic domain tracks of interest; at least one head for reading from and writing to the magnetic media, each head having the first and second EMR devices; a slider for supporting the head; and a control unit coupled to the head for controlling operation of the head.

14. A system, comprising:
an Extraordinary Magnetoresistive (EMR) device for deriving servoing information, the EMR device comprising:
a layer of electrically conductive material;
a layer of semi-conductor material formed adjacent to and contacting the layer of electrically conductive material, the layer of semi-conductor material having an edge surface opposite the electrically conductive material and having first and second ends separated by a length (L);
first and second electrically conductive current leads, in electrical communication with the semi-conductor material; and
first and second electrically conductive voltage leads in electrical communication with the semi-conductor material, the second current lead being located between the first and second voltage leads; and
a sensor for detecting magnetic fields of a magnetic domain of interest.

* * * * *

UNITED STATES PATENT AND TRADEMARK OFFICE
CERTIFICATE OF CORRECTION

PATENT NO. : 7,848,060 B2  
APPLICATION NO. : 12/487345  
DATED : December 7, 2010  
INVENTOR(S) : Bruce Alvin Gurney et al.

Page 1 of 1

It is certified that error appears in the above-identified patent and that said Letters Patent is hereby corrected as shown below:

IN THE SPECIFICATIONS:

col. 1, line 50 replace "die" with --the--;
col. 10, line 60 replace "die" with --the--;
col. 12, line 30 replace "die" with --the--;
col. 14, line 22 replace "oil" with --on--;
col. 15, line 60 replace "oil" with --on--.

Signed and Sealed this
Twenty-sixth Day of April, 2011

David J. Kappos
*Director of the United States Patent and Trademark Office*